US012007068B2

(12) United States Patent
Yamafune et al.

(10) Patent No.: US 12,007,068 B2
(45) Date of Patent: Jun. 11, 2024

(54) SUPPORT DEVICE

(71) Applicants: A.P.P.A.R.A.T.U.S. LLC, Tottori (JP);
World Scan Project, Corporation,
Tokyo (JP)

(72) Inventors: Kotaro Yamafune, Tottori (JP); Ryohei Uetaki, Tokyo (JP); Yasumasa Ichikawa, Tokyo (JP)

(73) Assignees: A.P.P.A.R.A.T.U.S. LLC, Tottori (JP);
World Scan Project, Corporation,
Tokyo (JP)

( * ) Notice: Subject to any disclaimer, the term of this patent is extended or adjusted under 35 U.S.C. 154(b) by 25 days.

(21) Appl. No.: 17/560,933

(22) Filed: Dec. 23, 2021

(65) Prior Publication Data

US 2022/0196203 A1    Jun. 23, 2022

(30) Foreign Application Priority Data

Dec. 23, 2020    (JP) ................................. 2020-213122
Sep. 8, 2021     (JP) ................................. 2021-145931

(51) Int. Cl.

| *F16M 13/02* | (2006.01) |
| *B63B 35/00* | (2020.01) |
| *F16M 11/06* | (2006.01) |
| *G03B 15/03* | (2021.01) |

(Continued)

(52) U.S. Cl.
CPC .............. *F16M 13/02* (2013.01); *B63B 35/00* (2013.01); *F16M 11/06* (2013.01); *G03B 15/03* (2013.01); *G03B 17/08* (2013.01); *G03B 17/561* (2013.01); *B63B 2035/006* (2013.01)

(58) Field of Classification Search
CPC ........ F16M 13/02; F16M 11/06; B63B 35/00; B63B 2035/006; G03B 15/03; G03B 17/08; G03B 17/561
See application file for complete search history.

(56) References Cited

U.S. PATENT DOCUMENTS 2,506,095 A  *  5/1950   Mantz ................... G03B 17/561
                                                     188/306
4,272,177 A  *  6/1981   Ottenheimer ........ G03B 17/561
                                                     396/425

(Continued)

FOREIGN PATENT DOCUMENTS

JP    2017527812 A    9/2017
WO    2016040229 A1   3/2016

*Primary Examiner* — Eret C McNichols
(74) *Attorney, Agent, or Firm* — Alix, Yale & Ristas, LLP (57) ABSTRACT

This invention provides a support device that can be attached to and detached from an unmanned submarine and can be attached with a photographing camera and an illumination light. The support device (100) of the present embodiment includes a first frame (10U, 10H) to which an unmanned submarine is attached/detached, a second frame (10B, 10V) formed corresponding to the first frame, and a support material (20) arranged between the first frame and the second frame so as to connect the first frame and the second frame and formed of a buoyancy material having a specific density of less than 1. Further, the support device includes a lighting mount (30) for an illumination light attached to the support material and a shooting mount (40) for a photographing camera attached to the support material or the second frame.

18 Claims, 10 Drawing Sheets

(51) Int. Cl.
*G03B 17/08* (2021.01)
*G03B 17/56* (2021.01)

(56) References Cited

U.S. PATENT DOCUMENTS

| | | | | |
|---|---|---|---|---|
| 4,514,067 A * | 4/1985 | Gallegos | ............... | G03B 17/561 |
| | | | | 224/908 |
| 7,463,280 B2 * | 12/2008 | Steuart, III | ............ | H04N 23/51 |
| | | | | 348/42 |
| 9,152,019 B2 * | 10/2015 | Kintner | ................ | G03B 17/561 |
| 9,402,026 B2 * | 7/2016 | St. Clair | ................ | H04N 23/698 |
| 9,413,930 B2 * | 8/2016 | Geerds | ................ | H04N 23/698 |
| 9,535,311 B2 * | 1/2017 | Bergsten | .............. | F16M 13/022 |
| 9,575,394 B1 * | 2/2017 | Wallace | ................ | H04N 23/51 |
| 9,602,702 B1 * | 3/2017 | Albadran | .............. | H04N 23/55 |
| 9,851,623 B2 * | 12/2017 | Macmillan | ............. | G03B 37/04 |
| 9,921,464 B1 * | 3/2018 | Choi | ...................... | F16M 13/04 |
| 10,027,948 B2 * | 7/2018 | Cole | ...................... | H04N 13/246 |
| 10,151,968 B2 * | 12/2018 | Roots | ..................... | G03B 17/04 |
| 10,244,226 B2 * | 3/2019 | Weaver | ................ | H04N 13/243 |
| 10,291,828 B1 * | 5/2019 | Hsu | ....................... | H04N 23/698 |
| 10,324,360 B2 * | 6/2019 | Stanton | ................ | G03B 17/561 |
| D857,083 S * | 8/2019 | Blatz | ...................... | G03B 35/08 |
| | | | | D16/242 |
| 10,447,993 B2 * | 10/2019 | Nelson | .................. | H04N 23/45 |
| 10,447,994 B2 * | 10/2019 | Cole | ...................... | G03B 35/08 |
| 10,481,481 B2 * | 11/2019 | Niewöhner | .......... | G03B 17/561 |
| 10,577,125 B1 * | 3/2020 | Burtt | ..................... | G03B 15/006 |
| 10,935,783 B1 * | 3/2021 | Saxena | .................. | G03B 17/08 |
| 11,412,134 B2 * | 8/2022 | Tolman | .................. | H04N 23/54 |
| 2007/0206945 A1 * | 9/2007 | DeLorme | ............... | G03B 41/00 |
| | | | | 396/332 |
| 2012/0154521 A1 * | 6/2012 | Townsend | ............. | H04N 23/90 |
| | | | | 348/E5.026 |
| 2012/0242788 A1 * | 9/2012 | Chuang | ................. | H04N 23/62 |
| | | | | 348/E7.001 |
| 2014/0153916 A1 * | 6/2014 | Kintner | ................. | H04N 13/243 |
| | | | | 396/419 |
| 2014/0267596 A1 * | 9/2014 | Geerds | ................... | H04N 23/51 |
| | | | | 348/38 |
| 2014/0362176 A1 * | 12/2014 | St. Clair | ................ | H04N 23/698 |
| | | | | 348/36 |
| 2016/0295108 A1 * | 10/2016 | Cao | ........................ | H04N 23/90 |
| 2016/0344999 A1 * | 11/2016 | Lajeunesse | ........... | H04N 23/90 |
| 2016/0352982 A1 * | 12/2016 | Weaver | ................. | H04N 23/695 |
| 2018/0046067 A1 * | 2/2018 | Roots | ..................... | G03B 17/561 |
| 2018/0210322 A1 * | 7/2018 | Malukhin | .............. | H04N 23/50 |

* cited by examiner

SUPPORT DEVICE

CROSS-REFERENCE TO RELATED APPLICATION

This application claims priority to and the benefit of Japan Patent Application No. 2020-213122, filed on Dec. 23, 2020, and Japan Patent Application No. 2021-145931, filed on Sep. 8, 2021, in the Japan Patent Office, the disclosures of which are incorporated herein by reference in their entireties.

TECHNICAL FIELD OF INVENTION

The present invention relates to a support device for a photographing apparatus used for photogrammetry that analyzes parallax information from a plurality of two-dimensional photographs to generate a three-dimensional photograph. In particular, it relates to a support device used for an unmanned submarine such as an underwater drone.

BACKGROUND OF THE INVENTION

Photogrammetry has begun to attract attention by recent improvements in image processing technology and computer processing speed. Photogrammetry is a technology that precisely digitizes images and positions from photographs taken from various angles and reproduces realistic three-dimensional objects from them. In order to facilitate photography for photogrammetry, for example, JP Unexamined Patent Publication No. 2017-527812 A1 discloses a scanner including a camera unit having two cameras and an irradiation unit.

SUMMARY OF INVENTION

However, in the scanner disclosed in JP Unexamined Patent Publication No. 2017-527812 A1, the photographing camera and the illumination light are fixed at predetermined positions on the arm, and an operator must hold the scanner in his/her hands and point the scanner in an appropriate direction. Further, since the scanner is carried by the operator, it is not suitable for photography for photogrammetry in water or in the sea (hereinafter, "in water" and "in the sea" are collectively referred to as in water, except special case) where it is difficult for the operator to move.

Therefore, the present invention provides a support device that can be attached to and detached from an unmanned submarine and can be attached with a photographing camera and an illumination light.

The support device of this embodiment comprises a first flame that is detachable to an unmanned submarine, a second frame provided corresponding to the first frame, and a support material formed of a buoyancy material with a specific density of less than 1. The support device comprises a lighting mount for illumination lights attached to the first frame, the second frame or the support material, and a shooting mount for photographing cameras attached to the first flame, second frame or the support material.

Further, the first frame may be formed in a cross shape, the second frame may be formed in a cross shape with arranged facing the first flame, and the support material may be arranged between the first frame and the second frame to be coupled to the first frame and the second frame.

The second frame has a flat plate having a size that covers the second frame, and a shooting mount may be attached to the flat plate instead of the support material or the second frame.

Further, it is preferable that the support device may include a connecting arm for connecting the first frame and the second frame, the first frame is formed in a straight line, and the support device has a first mounting portion for mounting the support material and a second mounting portion for mounting the support material. Then, it is preferable that the support material is arranged so as to intersect the first frame and connected by a connecting arm, and the support material is arranged on at least one of the first mounting portion and the second mounting portion.

The support device of another embodiment comprises the first frame formed in a cross shape to which the unmanned submarine is attached and detached, a flat plate corresponding to the size of the first frame, the support material which is arranged between the first frame and the flat plate so as to connect the first frame and the flat plate and formed of a buoyancy material having a specific density of less than 1. The support device further comprises a lighting mount for illumination lights that can be attached to the support material, and a shooting mount for photographing cameras that can be attached on a flat plat.

The lighting mount is rotatable around an axis so that the lighting direction of the illumination light attached to the lighting mount can be adjusted, and the shooting mount is rotatable around an axis so that the shooting direction of the photographing camera attached to the shooting mount can be adjusted.

Further, it is preferable that the lighting mount and the shooting mount are positioned so that the light source position of the illumination light attached to the lighting mount is arranged behind the shooting angle of view of the photographing camera attached to the shooting mount.

The support material may have a first surface on which the lighting mount is arranged and a second surface recessed inward from the first surface.

Further, the support device may comprise a pointer mount for a laser pointer that irradiates an object with a laser beam on at least one of the first frame, the second frame, and the support material. The pointer mount is preferably rotatable around an axis so that the irradiation direction of the laser pointer attached to the pointer mount can be adjusted.

The support material may comprise a weight mount for weights for adjusting the balance of the support device.

Further, the support material may comprise a detachable mount on which the unmanned submarine is attached/detached to the first frame, and a rail for moving the detachable mount.

The support device of the present invention can be attached to and detached from an unmanned submarine, and can be attached a photographing camera and an illumination light.

BRIEF DESCRIPTIONS OF THE DRAWINGS

FIG. 4A(1) is a front view of the support material.

FIG. 4A(2) is a side view of the support material.

BEST-MODE FOR CARRYING OUT THE INVENTION

Hereinafter, embodiments according to the present invention will be described in detail with reference to the drawings. In the present specification and the drawings, components having substantially the same functional configuration are designated by the same reference numerals. Therefore, duplicate description will be omitted. Also, in each drawing, the members of the device are not described according to the actual dimensions in order to emphasize them.

Support Device of the First Embodiment

Figure 1:
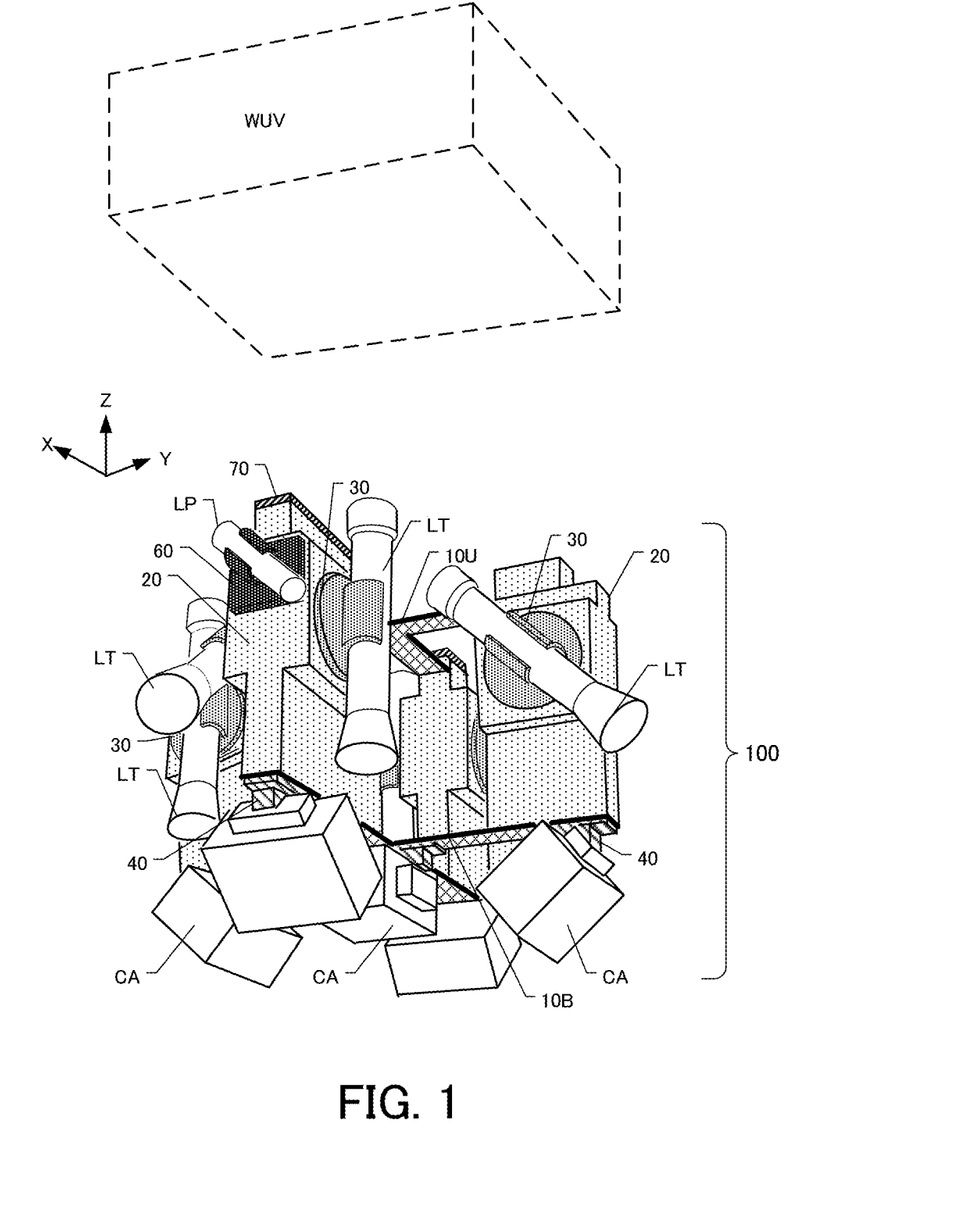
FIG. 1 is a perspective view of a support device in a state where a photographing camera, an illumination light, and the like are attached.

Overview of the Support Device:

FIG. 1 is a perspective view of the support device 100 of a first embodiment, and shows a state before mounting an unmanned submarine ROV such as an underwater drone. The support device 100 can be equipped with at least one or more photographing camera CA (with a waterproof housing), an illumination light LT, a laser pointer LP, and the like. In the following description, each direction of up/down, front/back, and left/right is defined as shown in FIG. 1. In the basic posture when the support device 100 is submerged in water, the water surface side is defined as the upper side (+Z axis) and the water bottom side is defined as the lower side (−Z axis). The direction in which the laser pointer LP is arranged is defined as the front (+X-axis) in the one-axis direction of one of the cross-shaped first frames described later, and the opposite side is defined as the rear (−X-axis). Then, in the other two-axis directions of the first frame, the back side of the paper surface in FIG. 1 is the right side (+Y axis), and the front side of the paper surface is the left side (−Y axis). Further, in the following description, the direction of rotation centered on the front-rear axis is the roll direction, the direction of rotation centered on the right-left axis is the pitch direction, and the direction of rotation centered on the vertical axis is the yaw direction.

The support device 100 is detachably attached to an unmanned submarine ROV such as an underwater drone. The support device 100 can be flexibly attached to and detached from the newly introduced unmanned submarine ROV almost every year.

The size of the support device 100 is configured to fit within, for example, 50 cm in the X-axis direction, 50 cm in the Y-axis direction, and 50 cm in the Z-axis direction. Since the unmanned submarine ROV is becoming smaller, the support device 100 may be even smaller in size. The support device 100 of the first embodiment does not have an electrical connection or wireless/wired signal transmission/reception with the unmanned submarine ROV. However, the support device 100 may be electrically connected (power supply/signal) to the unmanned submarine ROV if necessary.

The photographing camera CA including the still image camera and the moving image camera and the illumination light LT attached to the support device 100 can be freely changed according to the application. For example, for the photographing camera CA, there are a waterproof housing having a water depth of 60 m water resistant and a waterproof housing having a water depth of 250 m water resistant. Similarly, the illumination light LT also has a limit water depth of 60 m, 100 m, 150 m water resistant, or the like. Depending on the limit water depth of the unmanned submarine ROV, the water depth of the operating location, or the purpose of the user, the type of the photographing camera CA and its waterproof housing attached to the support device 100, or the illumination light LT can be changed.

The support device 100 has a cross-shaped upper first frame 10U and a cross-shaped lower second frame 10B. The first frame 10U and the second frame 10B are arranged so as to face each other. Further, the support device 100 has a support material 20 arranged between the first frame 10U and the second frame 10U so as to connect the first frame 10U and the second frame 10B. The support material 20 is formed by a buoyancy material having a specific density of less than 1. Further, the support device 100 includes a lighting mount 30 for an illumination light attached to the support material 20, a shooting mount 40 for a photographing camera attached to the second frame 10B, and a pointer mount 60 for a laser pointer attached to the support material 20. These members will be described in detail below with reference to FIGS. 2 and 3.

Figure 2:
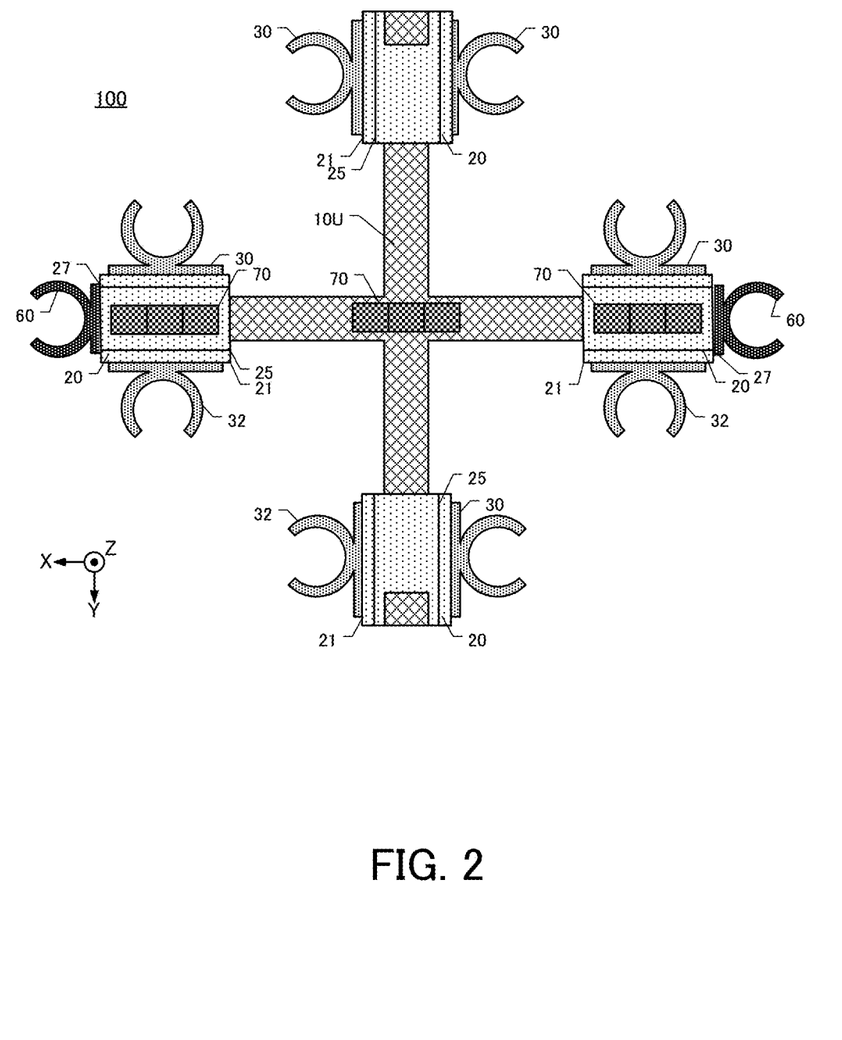
FIG. 2 is a plan view of a support device.
Figure 3:
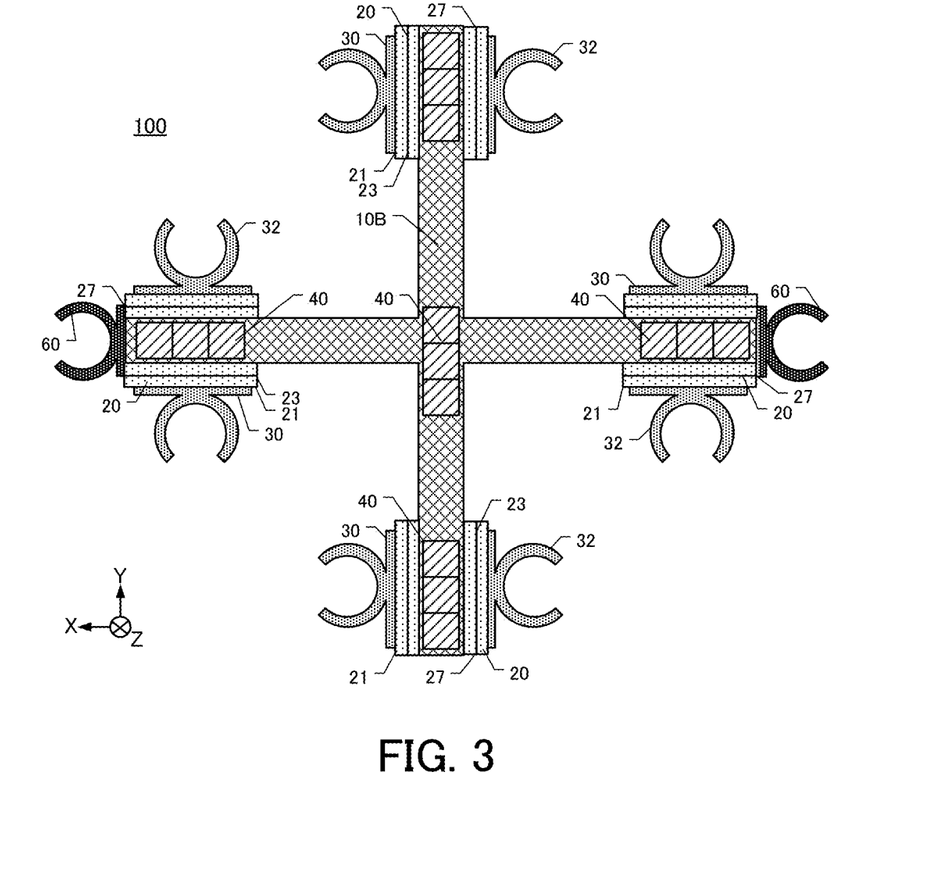
FIG. 3 is a bottom view of the support device.

Outline of Frame:

FIG. 2 is a plan view of the support device 100 observed from +Z axis direction, and FIG. 3 is a bottom view of the support device 100 observed from −Z axis direction. The first frame 10U shown in FIG. 2 is formed of a metal such as stainless steel, an aluminum alloy, or chrome steel, or a fiber reinforced plastic having high strength made of glass fiber, carbon fiber, or the like, and made by a 3D printer and so on. A metal that easily rusts, for example, an iron material is not preferable in consideration of being used in the sea, but when an iron material is used for the first frame 10U, it is preferably protected by a rust preventive paint. The width of the first frame 10U is, for example, 3 cm to 8 cm, and the length of the first frame 10U in the front-rear direction or the right-left direction is, for example, 30 cm to 60 cm. In the first embodiment, the lengths of the first frame 10U in the front-rear direction and the right-left direction are the same, but the lengths may be different from each other.

The second frame 10B shown in FIG. 3 is also made of the same metal material or reinforced plastic as the first frame 10U. Since the first frame 10U and the second frame 10B are connected by the plate-shaped support material 20 described later, they overlap each other when observed from upward or downward. In the first embodiment, the first and second cross-shaped frames are formed in a cross shape orthogonal to the X-axis direction and the Y-axis direction at 90 degrees, but the intersection angles may be changeable, for example, 45 degrees and 135 degrees.

Outline of Support Material:

The support material 20 is fixed to the front-rear end (X-axis direction) and the left-right end (Y-axis direction) of the first frame 10U and the second frame 10B. The support material 20 is a buoyant body having a specific gravity of 1 or less, and may be made of, for example, a glass fiber reinforced plastic material such as urethane foam, polyethylene foam, or, styrene foam. Since the unmanned submarine ROV may move deep into the water, reinforced styrofoam with pressure resistance and water resistance is particularly preferable. As described above, the support device 100 is attached with a photographing camera CA (with a waterproof housing), an illumination light LT, a laser pointer LP, and so on. In the first embodiment, at most five photographing cameras CA, eight illumination lights LT, and two laser pointer LPs are attached.

It is preferable that the volume of the support material 20 buoyant body and the material of the support material 20 maybe selected so that the maximum weights of the attached photographing camera CA, the illumination light LT, the laser pointer LP, and so on can be offset. For example, when the photographing camera CA is lighter or the number of photographing cameras to be attached is small, a weight (not shown) is attached to the support device 100. For example, a weight of 1 kg may be taped to the second frame 10B.

The support material 20 of the first embodiment is arranged at the front-rear end and the left-right end of the first frame 10U and the second frame 10B, respectively. For example, the front-rear support material 20 may be one support material 20 having a length equivalent to the length in the front-rear direction of the first frame 10U. That is, it may be composed of three support materials, one support material 20 extending in the X-axis direction and two support materials 20 extending in the Y-axis direction as shown in FIG. 2 or 3. When the total weight of the attached photographing camera CA, illumination light LT, and laser pointer LP becomes very heavy, the volume of the buoyant body can be increased by preparing one support material 20 that extends long in the X-axis direction and maximum weight can be offset.

Outline of Lighting Mount:

As shown in FIGS. 2 and 3, a lighting mount 30 for the illumination light LT is attached to the first surface 21 of the support material 20 by screwing or bonding. In this embodiment, eight lighting mounts 30 are attached to eight first surfaces 21 of the four support materials 20. The light holder 32 may be rotatable to the axis of the base of the lighting mount 30 so that the lighting mount 30 can direct the lighting direction of the illumination light LT according to the shooting direction of the photographing camera CA. Alternatively, when the base of the lighting mount 30 and the light holder 32 are fixed (non-rotatable), screw holes for attaching the lighting mount 30 to the support material 20 are arranged on the circumference, for example, every 30 degrees, and the base of 30 may be rotatable about the axis with respect to the support material 20. When the base of the lighting mount 30 and the light holder 32 are fixed, a turntable may be provided under the base of the lighting mount 30.

When the shooting direction of the photographing camera CA is limited, it is not always necessary to provide eight lighting mounts 30, and for example, only four lighting mounts 30 may be arranged. However, when creating a 3D model with photogrammetry, it is preferable that the photograph taken is sharp or not blur. In order to take a sharp picture, increase the shutter speed to make a picture without blurring due to movement, raise the aperture value (F value) to make a picture without blur, and lower the ISO value to make a picture with less noise. Therefore, it is preferable to arrange lighting mount 30 with 4 or more, preferably 6 or more to secure the amount of light from the illumination light LT.

Overview of Pointer Mount:

As shown in FIGS. 2 and 3, two pointer mounts 60 for laser pointer LP are attached to the fourth surfaces 27 at both ends of the support material 20 in the X-axis direction by screwing or bonding. Pointer mounts 60 may be attached to both ends of the support material 20 in the Y-axis direction. When the length of the first frame 10U in the front-rear direction is longer than the length in the left-right direction, it is preferable that the pointer mounts 60 are attached to both ends of the longer one. The laser pointers LP create to form the light spots emitted from the laser pointer LP on the bottom of the water or a cliff (wall surface) in the water, and utilize the distance between the two light spots in the photograph taken by the photographing camera CA. Then it is possible to give dimensions to the created digital 3D model. It is preferable that the pointer mount 60 is configured so that the direction of the light spot can be rotated about the axis according to the shooting direction of the photographing camera. In the first embodiment, the pointer mount 60 is attached to the fourth surface 27 of the support material 20, but it may be provided on the first frame 10U or the second frame 10B.

Overview of Detachable Mount:

The detachable mount 70 shown in FIG. 2 is a mount for attaching and detaching the unmanned submarine ROV. If the unmanned submarine ROV has an attachment/detachment device, it can be fitted with the attachment/detachment device. When the unmanned submarine ROV does not have an attachment/detachment device, the unmanned submarine ROV can be attached/detached with the tape by passing a tape or band by passing band through the hole (not shown) of the detachable mount 70. In FIG. 2, although three detachable mounts 70 are provided, not limited to three. For example, only one at the center of the cross may be provided, or five at the center and five on the front, back, left, and right may be provided, these arrangements are good. Further, the detachable mount 70 may be movable on the first frame 10U. The first frame 10U and the unmanned submarine ROV may be attached or detached with a tape or a band without providing the detachable mount 70.

Overview of Shooting Mount:

The shooting mount 40 shown in FIG. 3 is a mount for attaching and detaching the waterproof housing of the photographing camera CA. Since the bottom of the water (seabed) is often photographed, it is preferable that the shooting mount 40 is attached to the second frame 10B. Further, if the support material 20 has a structure (see FIG. 6) that penetrates the second frame 10B downward (−Z axis), the shooting mount 40 may be attached to the bottom surface of the support member 20.

The shooting mount 40 has a function equivalent to that of a universal head of a tripod. For example, the function of shooting mount 40 is configured so that the roll direction, pitch direction, and yaw direction can be freely set. The reference axis of the shooting mount 40 is the −Z axis direction in which the photographing camera CA housed in the waterproof housing observes the water bottom (seabed). Assuming that the −Z axis direction of the shooting mount 40 is 0 degrees, it is preferable that the photographing camera CA can photograph from the −90 degree direction to the +90 degree direction in the roll direction and from the −90 degree direction to the +90 degree direction in the pitch direction.

Photographing for creating a digital 3D model with photogrammetry is that each photo has sufficient overlap. That is, it is preferable that the first photograph and the second photograph overlap by 60% (horizontal direction) or 80% (vertical direction) or more. In order to create a more precise 3D model, it is preferable that the object to be photographed is shot from at least 3 different angles. Therefore, it is preferable that the support device 100 can be equipped with five photographing cameras CA in advance in the directions of downward, diagonally forward, downward, diagonally downward to the left, diagonally downward to the right, and diagonally downward to the rear. Conventional photogrammetry in water was done by a handheld camera and a diver takes pictures of one place from multiple angles. When five photographing cameras CA with a different shooting direction are installed, pictures for photogrammetry are taken just by moving the unmanned submarine ROV in one direction (for example, +X axis direction). It is preferable that five shooting mounts 40 are provided, but for example, if a steep cliff (wall surface) in water is mainly photographed, three shooting mounts 40 may be provided.

Figure 4A:
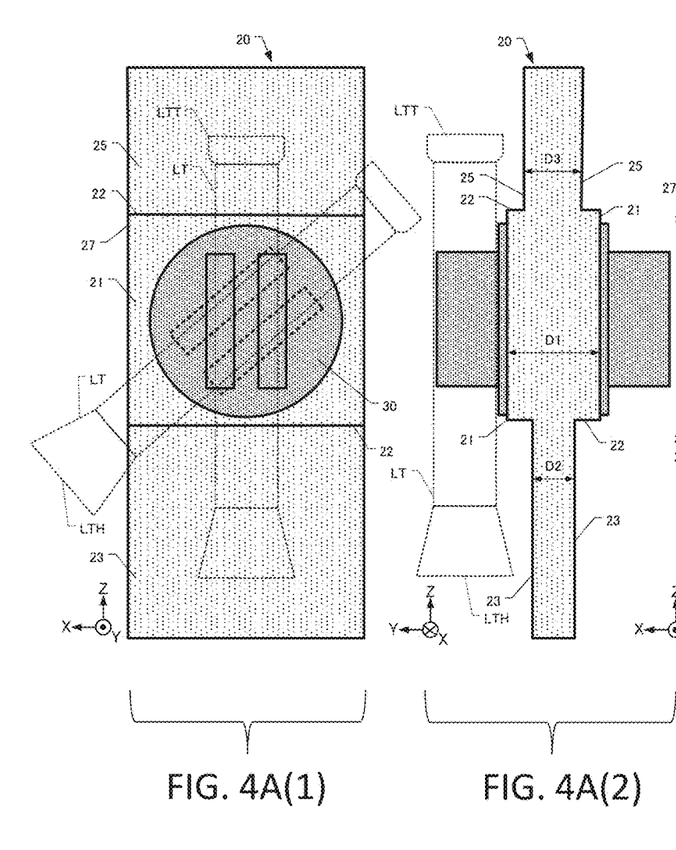
Figure 4B:
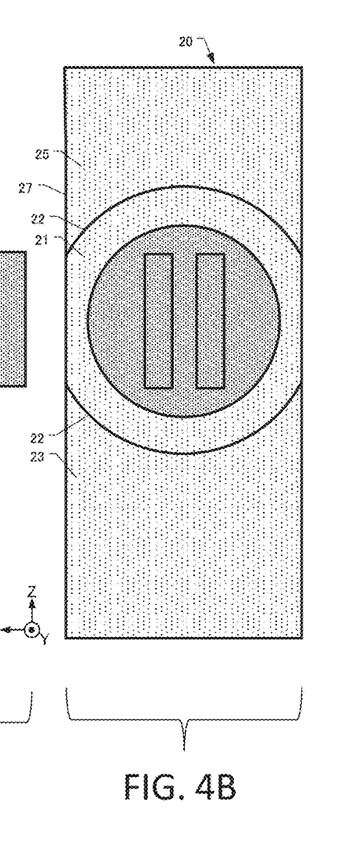
FIG. 4B is a front view of the support device of another embodiment.

Shape of Support Material:

FIG. 4 (A) is the support material 20 of the first embodiment, FIG. 4 (A1) is a view of observing the support material 20 from the +Y axis direction, and FIG. 4 (A2) is a view of observing the support material 20 from the −X axis direction. FIG. 4B is a view of the support material 20 of the second embodiment observed from the +Y axis direction. As shown in FIG. 4 (A2), the support material 20 has a first surface 21, a second surface 23, and a third surface 25 on one side, and the first surface 21 and the second surface 23 and a third surface 25 on the opposite side. Therefore, the first surface 21 and the first surface 21 form a thickness D1, the second surface 23 and the second surface 23 form a thickness D2, and the third surface 25 and the third surface 25 are Form thickness D3. The lighting mount 30 is arranged on the first surface 21.

As shown in FIG. 4(A), the illumination light LT generally has a circular body cross section and a light source head LTH having a trumpet-shaped diameter. Further, the illumination light LT generally has a battery lid LTT for inserting a primary battery or a secondary battery, and the battery lid LTT is often larger in diameter than the body. Therefore, in the rotation range of the illumination light LT attached to the lighting mount 30, it is preferable that the second surface 23 is recessed inward from the first surface 21 so that the light source head LTH or the battery lid LTT does not interfere with the support material 20. And the third surface 25 is preferably recessed inward from the first surface 21. Since there are various shapes of the illumination light LT, it is not necessary to provide the second surface 23 or the third surface 25 which are recessed inward from the first surface 21.

The step 22 (step between the first surface and the second surface and the step between the first surface and the third surface) of the support material 20 shown in FIG. 4 (A) is formed a straight line parallel to the X-axis or the Y-axis. However, as shown in FIG. 4B, the step 22 of the support material 20 may be formed in a circumferential shape.

Prevention of Backscatter:

As described above, in order to create a 3D model by photogrammetry, it is desired that the photographing camera CA captures a sharp photograph. Therefore, it is preferable that the light from the illumination light LT is as strong as possible. However, when the light from the illumination light LT hits a floating object in water, a backscatter (backscattering) phenomenon occurs in which the light is scattered and diffusely reflected in the direction in which the light comes, then blocking the view. In order to reduce this backscatter, the positional relationship between the illumination light LT and the photographing camera CA is adjusted.

Figure 5:
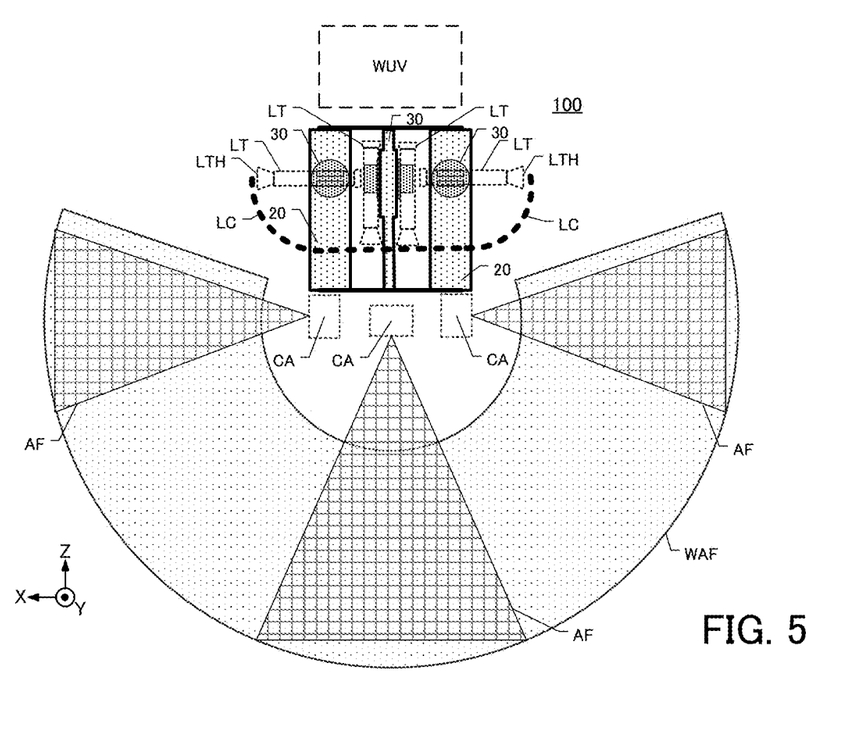
FIG. 5 is an explanatory diagram showing a reason why a backscatter does not occur in the support device.

FIG. 5 is a right-side view of the support device 100 on which four illumination lights LT and three photographing cameras CA are described. The illumination light LT on the +X-axis side of the four illumination lights LT faces forward (+X-axis direction), and the illumination light LT on the −X-axis side faces rearward (−X-axis direction). Further, the two illumination lights LT of the four illumination lights LT are directed downward (in the −Z axis direction). When the four illumination lights LT attached to the lighting mount 30 are rotatably moved downward from the horizontal direction, the locus LC of the light source head LTH of the illumination light LT becomes a locus indicated by a dotted line.

In FIG. 5, the front (+X-axis direction) photographing camera CA is drawn with the front (+X-axis direction) as the shooting direction. The rear (−X-axis direction) photographing camera CA is drawn with the rear (−X-axis direction) as the shooting direction. And the photographing camera CA in the center is drawn so as to shoot in the water bottom direction (−Z axis direction). The angle of view AF varies depending on whether the shooting lens of each photographing camera CA is a wide-angle lens or a telephoto lens. When the shooting mount 40 is rotated in each direction, the total angle of view range of these three photographing camera CA becomes maximum angle of view WAF shown in a fan-shaped.

As shown in FIG. 5, the locus LC of the light source head LTH is inside (+Z-axis direction) from the maximum angle of view WAF of the photographing camera CA. When the locus LC of the light source head LTH is inside the maximum angle of view WAF of the photographing camera CA, the backscatter can be reduced. The length of the illumination light LT varies from about 10 cm to 40 cm or more. It is preferable that the locus LC of the various light source heads LTH is inside the maximum angle of view WAF of the photographing camera CA. Therefore, it is preferable that the center position of the illumination mount 30 is located above half the length of the support material 20 in the Z-axis direction. Further, it is preferable that the shooting mount 40 is attached to the bottom surface of the second frame 10B or the support material 20 so as to be as lower as possible in the support device 100. Although not shown, the lighting mount 30 may be provided at the upper end (+Z axis) of the support material 20. Although the right-side view of the support device 100 is shown in FIG. 5, the positional relationship between the lighting mount 30 and the shooting mount 40 is the same in the left-side view, the front-side view, and the rear-side view.

Support Device of the Second Embodiment

Figure 6:
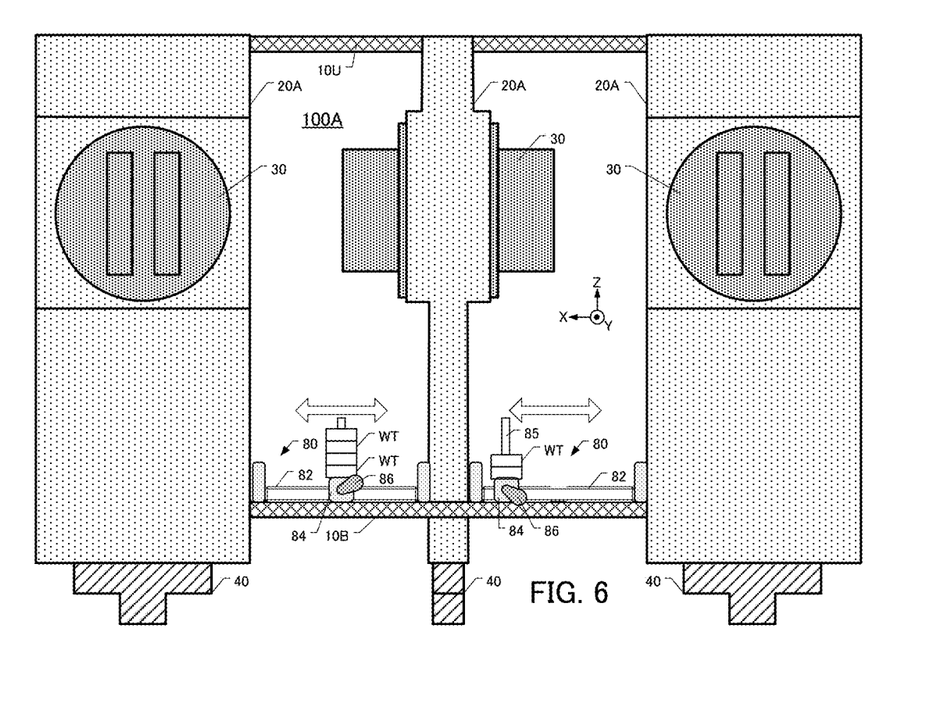
FIG. 6 is a support device of a second embodiment, and is a diagram showing a weight mount particularly for weights.

FIG. 6 is a side view of the support device 100A of the second embodiment. The support material 20A of the support device 100A has a structure that connects the first frame 10U and the second frame 10B and penetrates the second frame 10B downward (−Z axis). Therefore, the shooting mount 40 is attached to the bottom surface of the support material 20A. Further, the support device 100A has a weight mount 80 that the support device 100 of the first embodiment does not have.

When the lighting mount 30 and the shooting mount 40 are equipped with an illumination light LT and a photographing camera CA of the same weight, The support device 100 (and 100A) has a center of gravity in an axial shape connecting the cross-shaped intersection of the first frame 10U and the cross-shaped intersection of the first frame 10U in a well-balanced manner. However, when the weights of the illumination light LT and the photographing camera CA are different, or when the illumination light LT or the photographing camera CA is attached to some of the lighting mounts 30 or some of the shooting mounts, The center of gravity deviates from the axis connecting the intersections of the crosses. Further, even if the support device 100 is equipped with the illumination light LT and the photographing camera CA in a well-balanced manner, the support device 100 (and 100A) may be tilted due to the water flow (ocean current). On the contrary, when photographing a steep cliff (wall surface) in water, it may be better to keep the support device 100 (and 100A) tilted at a certain angle and photograph with the photographing camera CA.

The weight mount 80 shown in FIG. 6 has a rail 82, a pedestal 84, and a locking mechanism 86. The rail 82 has a groove and is made of a metal such as plastic or stainless steel or an aluminum alloy. The pedestal 84 is made of plastic or metal and has a retaining rod 85 for fastening the weight WT and a protrusion (not shown) that enters the groove of the rail 82, and the pedestal 84 can move along the rail 82. Further, the pedestal 84 has a lock mechanism 86 for locking the pedestal 84 on the rail 82.

It is preferable that the weight WT has a hole (not shown) and unevenness so that the stacking does not shift. And it is preferable that the weight of the weight WT can be adjusted by inserting the hole of the weight WT into the fastening rod 85 and stacking, for example, 250 g of the weight WT in 1 step, 2 steps, and 5 steps. The weight WT of the flat plate may be fastened with tape or the like without providing the fastening rod 85 on the pedestal 84.

An example of the balance adjustment of the support device 100A will be explained with reference to FIG. 6. It is assumed that the balance between the total weight and buoyancy of the support device 100A including the photographing camera CA, the illumination light LT, and the laser pointer LP matches the front (+X-axis side) pedestal 84, the four weight WTs, and the rear (−X-axis side) pedestal 84 with two weights WT. Further, it is assumed that the front pedestal 84 is locked by the lock mechanism 86 at the center position of the rail 82, and the rear pedestal 84 is also locked by the lock mechanism 86 at the center position of the rail 82. If the front is slightly lighter (about 50 g) in this state, the lock of the pedestal 84 on which the two rear weight WTs are placed is released, and the pedestal 84 is moved forward and locked by the lock mechanism 86. It is easier to make fine adjustments when the weight WT moves the pedestal 84 a long distance.

Although FIG. 6 shows an example in which the pedestal 84 is manually moved and locked by the lock mechanism 86, a ball screw, an electric motor, and an electric circuit may be added to the rail 82 to automatically adjust the balance. Although the right-side view of the support device 100A is shown in FIG. 6, when observed from the front side view, the support device 100A also has a weight mount 80 having a rail 82 extending in the Y-axis direction.

Support Device of the Third Embodiment and the Fourth Embodiment

Figure 7A:
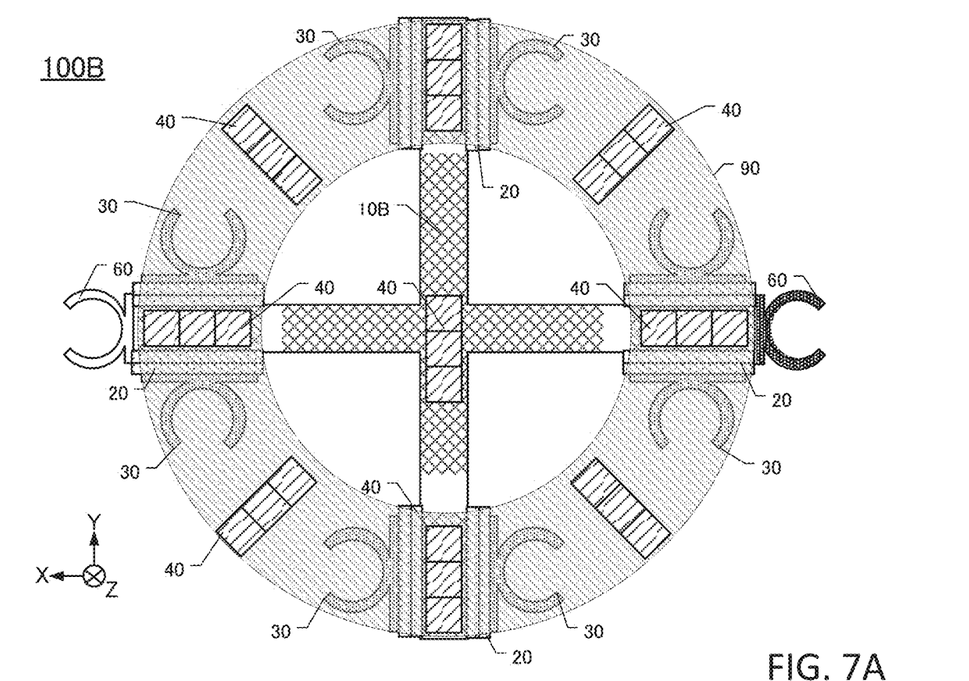
FIG. 7A is a bottom view of the support devices of a third embodiment in which nine photographing cameras can be mounted.

FIG. 7A is a bottom view of the support device 100B of the third embodiment. The support device 100B has an annular flat plate 90 that substantially covers the second frame 10B below the second frame 10B (in the −Z axis direction). The annular flat plate 90 is connected to the second frame 10B by screwing or welding. The annular flat plate 90 is preferably made of a metal such as stainless steel, aluminum alloy, or chrome steel, and has a mesh structure so as not to be affected by water flow. The shooting mount 40 is arranged at every 45 degrees of the annular flat plate 90, and together with the shooting mount 40 arranged at the center of the cross of the second frame 10B, a maximum of nine photographing cameras CA (with a waterproof housing) can be arranged. Since the number of photographing cameras CA is large, it is possible to sufficiently secure overlap between each photograph in the photography of photogrammetry.

Figure 7B:
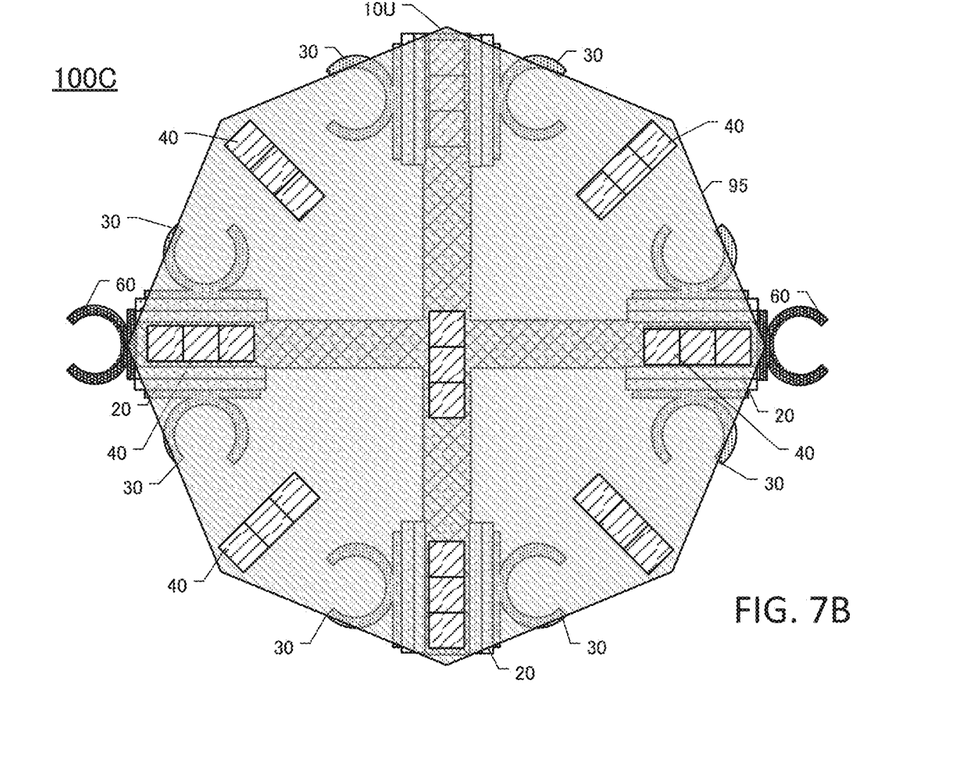
FIG. 7B is a bottom view of the support devices of a fourth embodiment in which nine photographing cameras can be mounted.

FIG. 7B is a bottom view of the support device 100C of the fourth embodiment. The support device 100C has an octagonal flat plate 95 having substantially the same length in the XY axis direction as the second frame 10B instead of the second frame 10B. The octagonal flat plate 95 is connected to the first frame 10U by a support material 20. The octagonal flat plate 95 is also made of a metal such as stainless steel. The shooting mount 40 is arranged at the corner of the octagonal flat plate 95, and the shooting mount 40 is also arranged at the center of the octagonal flat plate 95, so that a maximum of nine photographing cameras CA can be arranged.

The octagonal flat plate 95 of FIG. 7B is not formed with holes, but it is preferable that the octagonal flat plate 95 has a large hole like the flat plate 90 in order to make it less susceptible to the influence of water flow, and it is preferably a mesh structure. In the third embodiment, the annular flat plate 90 is attached below the second frame 10B, but as in the fourth embodiment, the annular flat plate 90 may be attached instead of the second frame 10B. Further, in the fourth embodiment, the octagonal flat plate 95 is attached, Not limited to the octagonal flat plate, it may be a polygonal flat plate. Further, as in the third embodiment, a polygonal flat plate may be attached below the second frame 10B.

When a flat plate is attached instead of the second frame 10B as in the fourth embodiment, the weight mount 80 shown in the second embodiment may be attached in the radial direction (in the case of a circular shape) or the longitudinal direction (in case of polygonal shape) of the flat plate.

Support Device of the Fifth Embodiment

Figure 8:
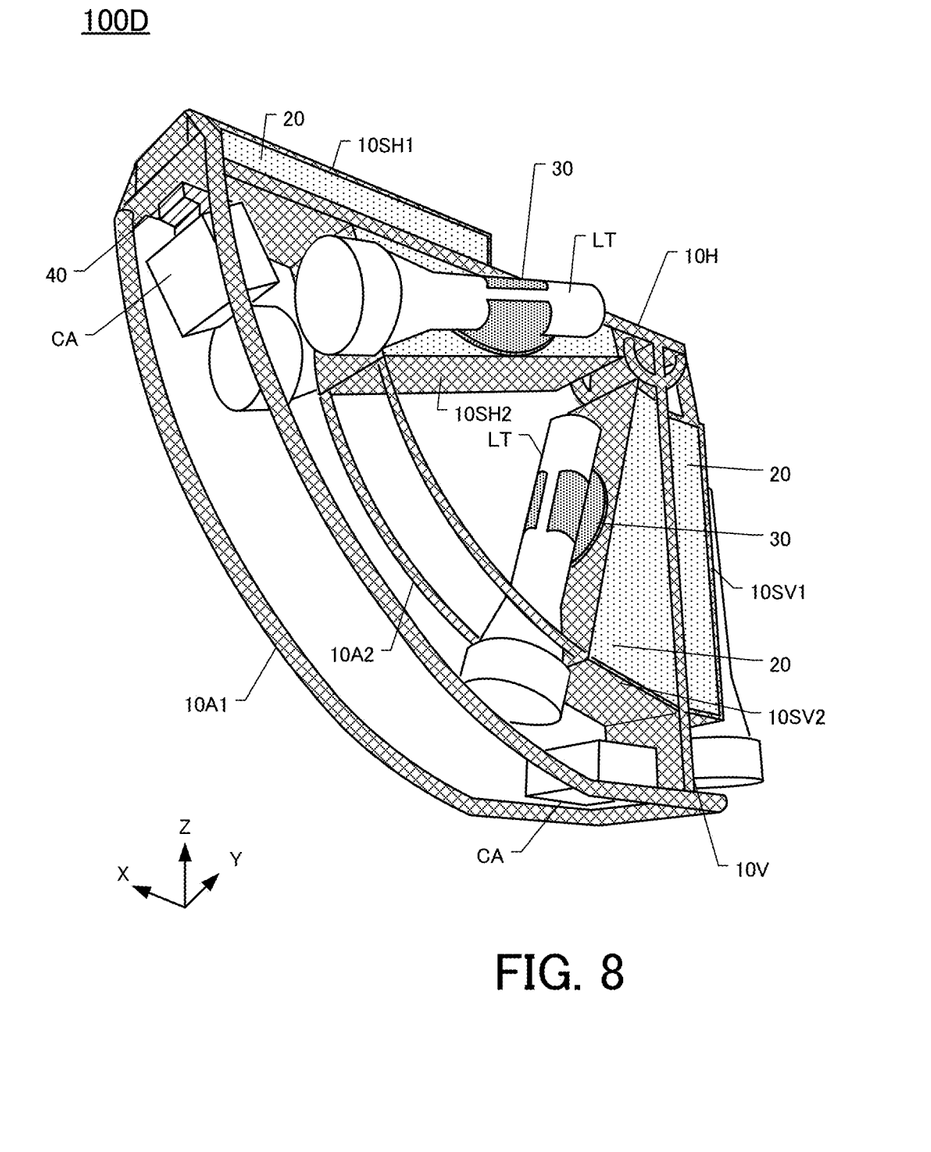
FIG. 8 is a perspective view of a support device according to a fifth embodiment in a state where a photographing camera, an illumination light, and the like are attached. The support device of the fifth embodiment has a structure that emphasizes portability.
Figure 9:
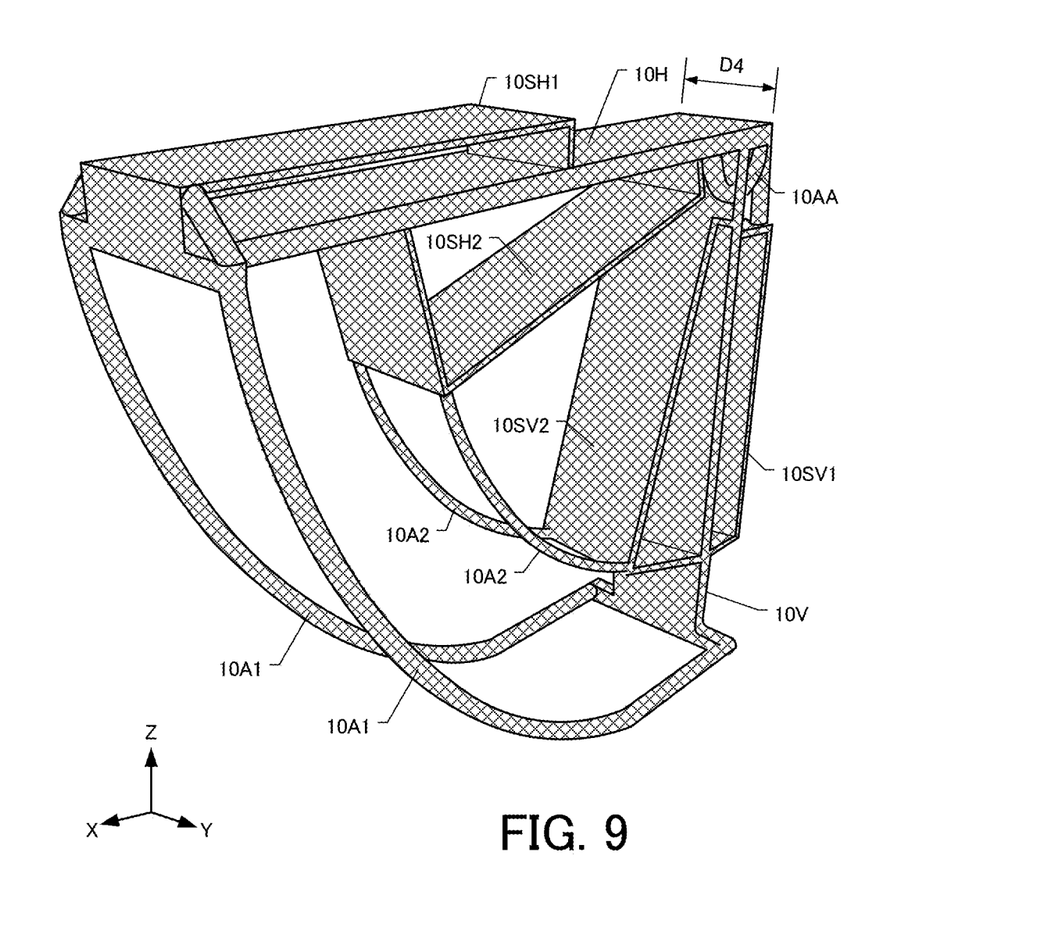
FIG. 9 is a perspective view of a frame of a support device according to a fifth embodiment.
Figure 10A:
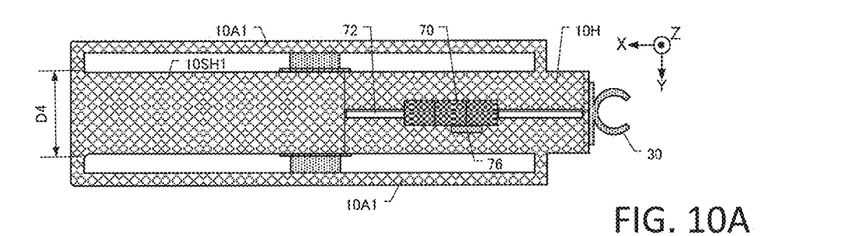
FIG. 10A is a plan view of the support device of the fifth embodiment.
Figure 10B:
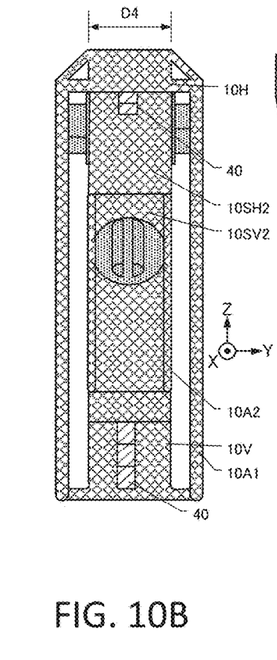
FIG. 10B is a front view of the support device of the fifth embodiment.
Figure 10C:
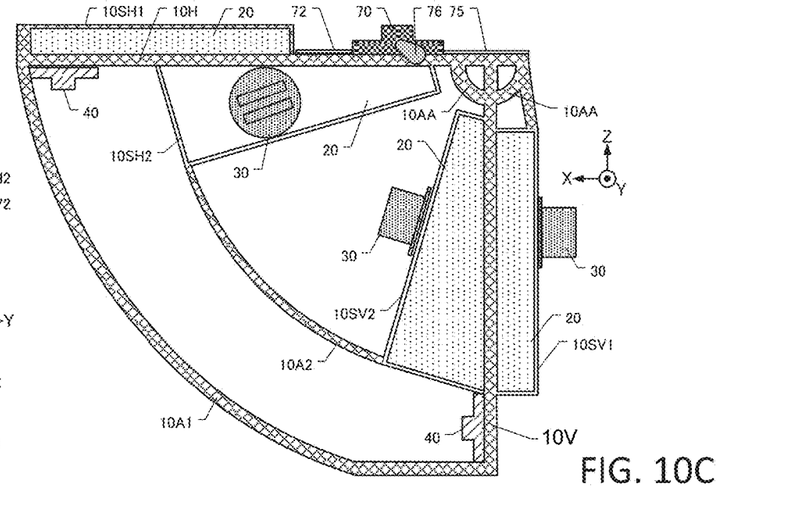
FIG. 10C is a side view of the support device of the fifth embodiment.

Overview of Support Device:

FIGS. 8 to 10 show the support device 100D of the fifth embodiment. FIG. 8 is a perspective view of the support device 100D, showing a state before mounting an Unmanned submarine ROV such as an underwater drone. FIG. 9 is a perspective view of the frame of the support device 100D. FIG. 10 (A) is a plan view of the support device 100D, FIG. 10 (B) is a front view thereof, and FIG. 10 (C) is a side view thereof. The support device 100D can be equipped with at least one or more photographing camera CA (with a waterproof housing), an illumination light LT, a laser pointer LP, and the like. In the following description, each direction of up/down, front/back, and left/right is defined as shown in FIG. 8.

The support device 100D is detachably attached to an unmanned submarine ROV such as an underwater drone, as in the first to fourth embodiments. Further, the support device 100D is lighter and smaller than the first to fourth embodiments. It is preferable that the size of the support device 100D is configured to fit, for example, 40 cm or less in the X-axis direction, 15 cm or less in the Y-axis direction, and 40 cm or less in the Z-axis direction, and can be stored in a travel suitcase. The photographing camera CA and the illumination light LT attached to the support device 100D can be freely changed according to the application.

In the fifth embodiment, up to two photographing cameras CA and four illumination lights LT are attached to the support device 100D. The support device 100D includes a support material 20 and a lighting mount 30 for an illumination light attached to the second frame 10V, and a shooting mount 40 for a photographing camera attached to the first frame 10H and the second frame 10V, respectively.

In the fifth embodiment, the laser pointer LP is not attached, but a pointer mount 60 for a laser pointer similar to that in the first embodiment may be attached to the support device 100D. In the fifth embodiment, the pointer mount 60 may be attached to the first frame 10H, the second frame 10V, or the support material 20, which will be described later. The support material 20 of the fifth embodiment may be a buoyant body similar to that of the first embodiment and so on.

Outline of Frame:

In particular, as shown in FIG. 9, the support device 100D has a plate-shaped first frame 10H extending horizontally and a plate-shaped second frame 10V extending vertically so as to intersect the first frame 10U. The first frame 10H and the second frame 10V are formed of the same metal material or reinforced plastic by a 3D printer as the first frame 10U of the first embodiment.

The width D4 of the first frame 10H and the second frame 10V is, for example, 3 cm to 8 cm, and the length of the first frame 10U in the front-rear direction and the length of the second frame 10V in the vertical direction are, for example, 20 cm to 40 cm. In the fifth embodiment, the widths D4 of the first frame 10H and the second frame 10V are the same, but may be different from each other. One end of the first frame 10H and one end of the second frame 10V are reinforced with a brace material 10AA and joined at an angle of 80-100 degrees. The other end of the first frame 10H and the other end of the second frame 10V are reinforced by the first reinforcing arm 10A1.

Further, the first frame 10H has first mounting portions 10SH (10SH1, 10SH2) for mounting the support material 20 on the upper side (+Z axis side) and the lower side (−Z axis side), respectively, and the second frame 10V has a second mounting portion 10SV (10SV2, 10SV1) for mounting the support material 20 in the front (+X-axis side) and the rear (−X-axis side) each. A part of the lower first mounting portion 10SH2 and a part of the front second mounting portion 10SV2 are reinforced by the second reinforcing arm 10A2.

A rectangular support material 20 is attached to the first attachment portion 10SH1 and the second attachment portion 10SV1 when viewed from the Y-axis direction (XZ plane), and the first attachment portion 10SH2 and the second attachment portion 10SV2 can be attached the trapezoidal support material 20 when viewed from the Y-axis direction, but the shape is not limited to this. For example, the shape of the first mounting portion 10SH and the second mounting portion 10SV may be a semicircular shape or a triangular shape. The first mounting portion 10SH and the second mounting portion 10SV are formed so as to cover four surfaces of the rectangular or trapezoidal support material 20, but have at least one surface, and it may be a structure to be tied up the support material 20 with a string or a rope.

Shape of Support Material:

The support member 20 is a buoyant body having a shape that matches the first mounting portion 10SH1 and the second mounting portion 10SV1, and is a buoyant body having a shape that matches the first mounting portion 10SH2 and the second mounting portion 10SV2. In FIGS. 8 and 10, the width (Y-axis direction) of the support material 20 coincides with the width D4 of the first mounting portion 10SH or the second mounting portion 10SH, but the support material 20 may be adjusted to be wide or narrow so that the weight of the attached photographing camera CA and lighting light LT, etc. can be offset.

Prevention of Backscatter:

Similarly to the first embodiment, the support device 100D of the fifth embodiment also adjusts the positional relationship between the illumination light LT and the photographing camera CA in order to reduce the backscatter. Two lighting mounts 30 for the illumination lights LT are arranged behind the shooting mount 40 of one photographing camera CA facing forward (in the −X-axis direction), and two lighting mounts 30 for the illumination light LT are arranged above the imaging mount 40 of one photographing camera CA facing downward (in the +Z-axis direction). Each illumination light LT will be installed at the rear portion of the photographing camera CA in the photographing direction, and the backscatter caused by the light hitting the floating matter in the water can be minimized.

Overview of Detachable Mount:

The detachable mount 70 shown in FIGS. 10A and 10C is a mount for attaching/detaching the unmanned submarine ROV. The support devices 100 (100A to 100C) of the first to fourth embodiments have an axial center of gravity connecting the cross-shaped intersections of the first frame 10U and the cross-shaped intersections of the first frame 10U. On the other hand, the support device 100D of the fifth embodiment is symmetrical in the left-right (Y-axis) direction, but is not configured symmetrically in the front-rear (X-axis) direction. Therefore, when the unmanned submarine ROV mounts the support device 100D via the detachable mount 70, it may not be possible to balance in the front-rear direction. Therefore, the detachable mount 70 shown in FIGS. 10A and 10C is provided with a rail 72 for moving the detachable mount 70 and a lock mechanism 76 for locking the detachable mount 70.

The rail 72 is made of plastic or metal, and the detachable mount 70 is movable along the rail 72. The operator attaches the photographing camera CA to the shooting mount 40 and the illumination light LT to the lighting mount 30 of the support device 100D, and then attaches the unmanned submarine ROV to the support device 100D via the detachable mount 70. The unmanned submarine ROV attached to the support device 100D is submerged in water, while the position of the detachable mount 70 is determined by the lock mechanism 76 in consideration of the balance of the support device 100D.

In the fifth embodiment, the detachable mount 70 can be moved in the front-rear direction, but the detachable mount 70 may be fixed. In this case, it is preferable to provide the weight mount 80 described in FIG. 6 on the support device 100D. The weight mount 80 can move the weight WT in the front-rear direction to balance the support device 100D.

In the first embodiment, since five photographing cameras CA can be mounted on the support device 100, photographs for photogrammetry can be taken only by moving the unmanned submarine ROV in one direction (for example, the +X-axis direction). On the other hand, in the fifth embodiment, since only two photographing cameras CA can be mounted, it is preferable that the unmanned submarine ROV reciprocates in one direction. For example, the unmanned submarine ROV moves in the +X-axis direction, rolls +30 degrees to move in the −X-axis direction, and finally rolls −30 degrees and moves in the +X-axis direction, and photographs for photogrammetry can be taken, which is almost the same as that of the first embodiment.

The support device of the present disclosure is effective for photogrammetry because a photographing camera that shoots from various angles can be arranged. In addition, since it is possible for an operator to easily take a picture without diving into the water, it can be widely applied to a device for performing various operations in water.

DESCRIPTION OF REFERENCE NUMERALS

100 (100A-100D) . . . Support device
10U, 10H . . . 1st frame, 10B, 10S . . . 2nd frame
10SH (10SH1, 10SH2) . . . First mounting portion
10SV (10SV2, 10SV1) . . . Second mounting portion
20 . . . Support material, 30 . . . Lighting mount
40 . . . Shooting mount 60 . . . Pointer mount
70 . . . Detachable mount, 72 . . . Rail, 76 . . . Lock mechanism
80 . . . Weight mount, 82 . . . Rail, 86 . . . Lock mechanism
90, 95 . . . Flat plate
CA . . . Photographing camera
LT . . . Illuminating light
LP . . . Laser pointer
WT . . . Weight
ROV . . . Unmanned submarine (underwater drone)

What is claimed is:

1. A support device, comprising:
a first frame;
a detachable mount for attaching and detaching an unmanned submarine, which is provided on the first frame;
a second frame provided corresponding to the first frame;
a support material coupled to the first frame and the second frame and formed of a small buoyancy material with a specific density of less than 1;
a lighting mount for illumination lights attached to the first frame, second frame or support material; and
a shooting mount for photographing cameras attached to the first frame, the second frame or support material,
wherein the first frame is formed in a cross shape;
the second frame is formed in a cross shape with arranged facing the first frame;
the support material is arranged between the first frame and the second frame so as to connect the first frame and the second frame.

2. The support device of claim 1,
wherein the second frame has a flat plate having a size covering the second frame; and
the shooting mount is attached to the flat plate in place of the support material or the second frame.

3. The support device of claim 1, further comprising:
a connection arm for connecting the first frame and the second frame; wherein
the first frame is formed in a straight line and has a first mounting portion for attaching the support material;
the second frame is formed in a straight line and has a second mounting portion for mounting the support material and is arranged so as to intersect the first frame to be connected by the connecting arm; and
the support material is arranged on at least one of the first mounting portion and the second mounting portion.

4. The support device of claim 1,
the lighting mount is rotatable around an axis so that the illumination direction of the illumination light attached to the lighting mount can be adjusted;
the shooting mount is rotatable around the axis so that the shooting direction of the photographing camera attached to the shooting mount can be adjusted.

5. The support device of claim 4, wherein the lighting mount and the shooting mount are positioned so that the light source position of the illumination light attached to the lighting mount is arranged behind the shooting angle of view of the photographing camera mounted on the shooting mount.

6. The support device of claim 1, wherein the support material has a first surface on which the lighting mount is arranged and a second surface recessed inward from the first surface.

7. The support device of claim 1, further comprising a pointer mount for a laser pointer that irradiates an object with laser light on at least one place of the first frame, the second frame and the support material.

8. The support device of claim 7, wherein the pointer mount is rotatable about an axis so that the irradiation direction of the laser pointer attached to the pointer mount can be adjusted.

9. The support device of claim 1, further comprising a weight mount for weights for adjusting the balance of the support device.

10. The support device of claim 1, wherein the detachable mount is movable relative to the first frame.

11. A support device comprising:
a first frame formed in a cross shape;
a detachable mount for attaching and detaching an unmanned submarine, which is provided on the first frame;
a flat plate corresponding to the size of the first frame;
a support material arranged between the first frame and the flat plate so as to connect the first frame and the flat plate, and formed of a buoyancy material having a specific gravity of less than 1;
a lighting mount for illumination light attached to the support material;
a shooting mount for a photographing camera attached to the flat plate.

12. The support device of claim 11,
the lighting mount is rotatable around an axis so that the illumination direction of the illumination light attached to the lighting mount can be adjusted;
the shooting mount is rotatable around the axis so that the shooting direction of the photographing camera attached to the shooting mount can be adjusted.

13. The support device of claim 12, wherein the lighting mount and the shooting mount are positioned so that the light source position of the illumination light attached to the lighting mount is arranged behind the shooting angle of view of the photographing camera mounted on the shooting mount.

14. The support device of claim 13, wherein the pointer mount is rotatable about an axis so that the irradiation direction of the laser pointer attached to the pointer mount can be adjusted.

15. The support device of claim 11, wherein the support material has a first surface on which the lighting mount is arranged and a second surface recessed inward from the first surface.

16. The support device of claim 11, further comprising a pointer mount for a laser pointer that irradiates an object with laser light on at least one place of the first frame, the second frame and the support material.

17. The support device of claim 11, further comprising a weight mount for weights for adjusting the balance of the support device.

18. The support device of claim 11, comprising:
   a detachable mount to which the unmanned submarine is attached and detached from the first frame; and
   a rail to move the detachable mount.

* * * * *